United States Patent [19]

Lahm et al.

[11] 4,058,034

[45] Nov. 15, 1977

[54] LATHE WITH MULTIPLE TOOL TURRET

[75] Inventors: Heinrich Lahm, Esslingen-Sirnau; Dieter Gutbrod, Aichwald-Aichschiess, both of Germany

[73] Assignee: Index-Werke KG Hahn & Tessky, Esslingen, Germany

[21] Appl. No.: 691,413

[22] Filed: June 1, 1976

[30] Foreign Application Priority Data

June 12, 1975 Germany .............................. 2526342

[51] Int. Cl.² .......................... B23B 3/00; B23B 29/00
[52] U.S. Cl. ........................................ 82/2 R; 82/36 A
[58] Field of Search .............. 82/2 R, 2 A, 2 B, 36 A; 29/27 R, 27 A, 26 R, 26 A, 26 B; 408/35

[56] References Cited

U.S. PATENT DOCUMENTS

| 3,288,003 | 11/1966 | Luebkemann | 82/2 R |
| 3,943,802 | 3/1976 | Luebkemann et al. | 82/2 R |
| 3,955,257 | 5/1976 | Herbst et al. | 82/36 A |

Primary Examiner—Harrison L. Hinson
Attorney, Agent, or Firm—Olsen and Stephenson

[57] ABSTRACT

Automatic turret lathe apparatus is disclosed in which a single turret head is provided that can support a plurality of tools for performing machining operations on both outside and inside surfaces of a workpiece carried on the live spindle of the lathe. The axis of the turret head is disposed at a preferred angular relationship to the axis of the live spindle, and the receiving or mounting surfaces for the inside and outside machining tools are disposed alternately around the axis of the turret head in planar arrangements that provide optimum operating conditions for utilizing the outside and inside machining tools on a single turret head.

8 Claims, 3 Drawing Figures

LATHE WITH MULTIPLE TOOL TURRET

REFERENCE TO RELATES APPLICATION

This application relates to copending application, Ser. No. 691,347, filed June 1, 1976, entitled "Automatic Turret Lathe".

BACKGROUND OF THE INVENTION

The invention relates to an automatic turret lathe on which at least one turret head is provided on a turret carriage, with tool receivers located at an angular distance from each other for holding inside and outside machining tools in association with a live spindle, and in which the indexing axis of the turret head is placed at an acute angle to the axis of the live spindle.

An automatic turret lathe is known which has a turret head arrangement wherein the tools for inside machining and the tools for outside machining of the parts are placed on different turret heads, so that the tools for outside machining are located on a crown turret head, while the tools for inside machining are mounted on a star turret head (see brochure of Cincinnati-NC Turning Centers, p. 15, 1972).

The dual turret head arrangement of this known design requires a technically expensive overall concept, because, on the one hand, turret indexing devices must be provided for both turret heads, and, on the other hand, the well-known collision considerations must be taken into account.

SUMMARY OF THE PRESENT INVENTION

It is a primary object of the present invention to provide an automatic turret lathe which combines the technical advantages of the known dual turret head arrangement but avoids the disadvantages resulting from it.

To realize this object, the invention makes use of an automatic turret lathe of the above-described design, characterized by the fact that the tool receivers of the turret head serve alternately to receive the outside machining tools and inside machining tools, where at least the tool receivers for the outside machining tools are located on the periphery of the turret head and the tool receivers for the inside machining tools are arranged perpendicularly to the tool receivers for the outside machining tools.

Accordingly, the invention offers the same machining possibilities with only one turret head as the known turret lathe with a dual turret head arrangement. The special arrangement of inside and outside machining tools on the turret head and its oblique position makes it possible to utilize inside machining tools which can be driven by rotation to advantage.

The tool receivers on the turret head can be formed of cylindrical or conical bores in which the tools can be inserted with suitable tenons which can be locked. In a preferred design, however, these are formed by at least one receiving surface, of which those for outside machining tools, when in working position, are located in a plane perpendicular to the live spindle axis and penetrated by the latter, while the receiving surfaces for the inside machining tools, in their working position, are in a plane parallel to the live spindle axis. At the same time, it is of advantage if the planar tool receiving surfaces of the inside machining tools form the base of groove-like depressions of the turret head. It will be of advantage to form the walls of these groove-like depressions accepting the tool holders for the inside machining tools in a concave curvature and to provide them in such a way that when they are swung into their working position, they can be adjusted coaxial to the live spindle. Consequently, the turret head for inside machining of parts can be driven up to directly in front of the part clamping site of the live spindle, since the parts can enter the depressions of the turret head.

In a further favorable development of the invention, the tool receivers of the outside machining tools can be adjusted and locked on the assigned receiving surfaces of the turret head perpendicular to the live spindle axis and the tool receivers of the inside machining tools can be adjusted and locked on the receiving surfaces assigned to these parallel to the live spindle. Such an adjustability offers the further important advantage that the cutting edges of the outside and inside machining tools can be adjusted to an approximately identical cutting circle, so that bridging of the position distances otherwise present on turret heads in their adjusted working position by means of an additional carriage path can be eliminated. Thus, shorter paths of the turret carriage and therefore also shorter and smaller structural components will be suitable.

In a special version of the invention, the location of the tool receiving surfaces for the inside machining tools in the turret head is selected in their working position in such a way that the distance of these tool receiving surfaces from the end of the neighboring receiving surfaces for the outside machining tools oriented toward the front turret head face is greater by a multiple than their distance from the end of the receiving surfaces for the outside machining tools oriented toward the back turret head face. On the basis of the arrangement of the tool receiving surfaces for the outside machining tools perpendicular to the tool receiving surfaces for the inside machining tools, referred to the working position, the tool receiving surfaces of the latter can have an optimum length with a compact turret head diameter with a relatively small axial dimension of the turret head with consideration of the oblique arrangement of the latter at an angle of particularly 60° to the live spindle axis, because the ratio of the length of the clamping surface to the size of the tool holders and tools favors the desired approximately identical cutting edge position of both types of tools.

Other objects of this invention will appear in the following description and appended claims, reference being had to the accompanying drawings forming a part of this specification wherein like reference characters designate corresponding parts in the several views.

DESCRIPTION OF THE PREFERRED EMBODIMENT

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
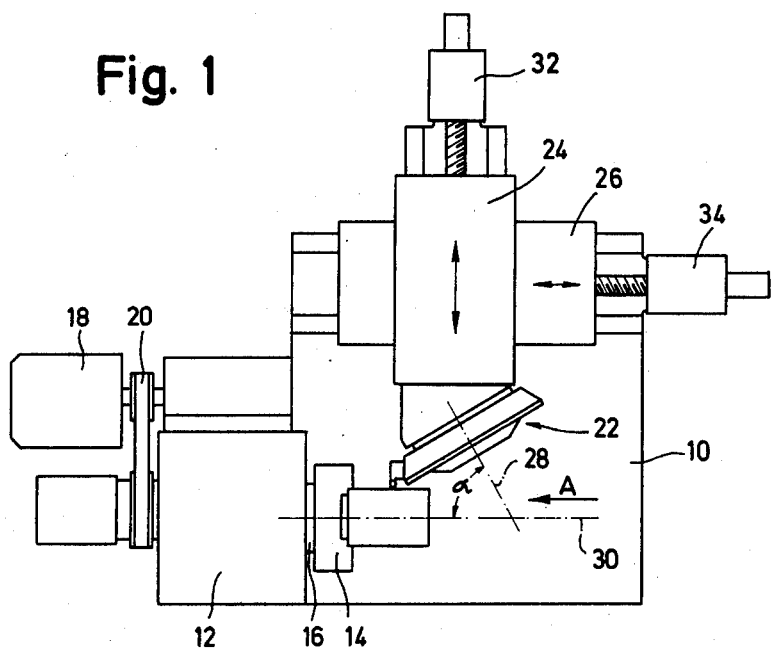
FIG. 1 is a schematic top view of an automatic turret lathe provided with a turret head arrangement according to the invention.
Figure 2:
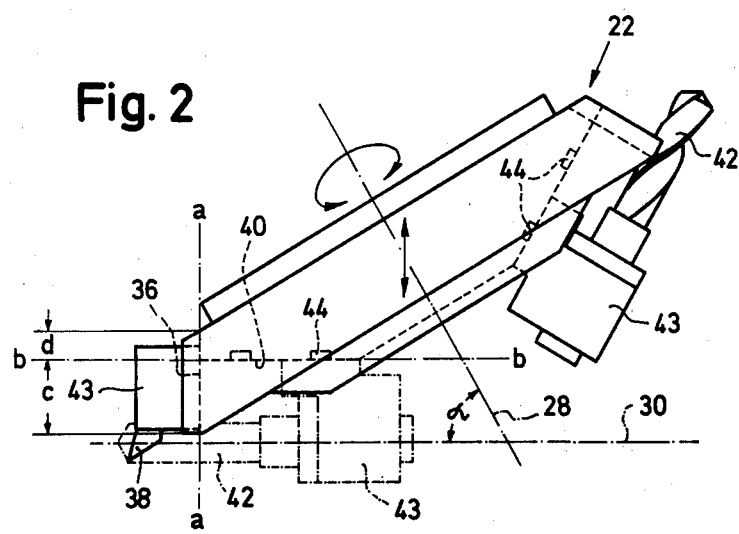
FIG. 2 is an enlarged top view of the turret head of the automatic turret lathe.

The machine bed of the automatic turret lathe is designated by the reference number 10. It carries a headstock 12 in which a live spindle 16 provided, for example, with a hydraulically operating check 14 is supported so that it can be driven by means of a drive motor 18 and a belt drive 20. Associated with the live spindle 16 is an indexing turret head 22 which is supported so that it can be indexed around a horizontal indexing axis 28 on an upper carriage 24, which forms a turret carriage, and which belongs to a cross carriage formed from the latter and a lower carriage 26. The feed carriage forming the upper carriage 24 can be adjusted perpendicular to the live spindle axis 30, i.e. radially to the latter, by means of drive 32, while a drive 34 serves to adjust the lower carriage 26 carrying the feed carriage parallel to the horizontal spindle axis 30. The turret head indexing axis 28 and live spindle axis 30 are located in a common horizontal plane e—e, the former being inclined to the live spindle axis 30 at an acute angle a of preferably 60°. As shown by FIG. 2, the turret head 22 has planar receiving surfaces 36 for the outside machining tools 38 and planar receiving surfaces 40 for the inside machining tools 42. The receiving surfaces 36 for the outside machining tools 38 are located on the outer periphery of the turret head in a plane a—a, which is perpendicular to the live spindle axis 30 and penetrated by the latter. The receiving surfaces 40 for the inside machining tools, in their working position, are perpendicular to the receiving surfaces 36 and located in a plane b—b parallel to the live spindle axis 30. Furthermore, these receiving surfaces are provided in alternating arrangement, the location of receiving surfaces 40 for the inside machining tools 42 in their adjusted working position and, according to FIG. 2, in the projection of the turret head 22 on a plane through the indexing axis 28 and live spindle axis 30 being selected in such a way that their distance c from the end of the neighboring receiving surfaces 36 for the outside machining tools oriented toward the front turret head face is greater by a multiple than their distance d from the end of receiving surfaces 36 oriented to the rear turret head face. Such a mutual assignment of the receiving surfaces and the oblique position of turret head 22 to live spindle 16 makes it possible to give the receiving surfaces 40 for the inside machining tools a relatively great length with a relatively small turret head diameter with a relatively small axial dimension of the turret head, and thus also allows positioning of relatively long inside machining tools, e.g. drills, on the turret head in such a way that the cutting edges of the outside and inside machining tools 38, 42 can be adjusted approximately to the same working point. This possibility for adjustment offers the advantage that outside and inside machining of appropriate parts can be performed with the outside and inside machining tools at a constant axial adjustment of the live spindle 16 for performing the machining feed. Thus, the provision of additional feed paths to bridge position deviations or cutting edge distances of the outside and inside machining tools set into their working position, which are otherwise necessary, are eliminated. The special mutual arrangement of the receiving surfaces 36, 40 thus makes it possible to operate with shorter feed paths and shorter turret carriage paths and to set the next tool without collision after briefly lifting a tool cutting edge away from the part. Furthermore, inside machining tools operating by rotary motion can be favorably accommodated in turret head 22 on receiving surfaces 40, particularly because of the oblique arrangement of turret head 22, and in addition, inside machining tools are readily accessible from the operating side of the machine. The inside and outside machining tools are held in tool holders 43 in the conventional manner, where at least the receiving surfaces 40 for the inside machining tools are provided with several spaced mounting points 44 in order to allow positioning of the corresponding tool holders in a suitable position on these surfaces.

For mounting the tool holders 43 for the outside machining tools, the corresponding receiving surfaces 36 advantageously from the base of a dovetailed guide, which is not shown in detail, and the side walls of which, which are inclined toward each other, engage positively with the corresponding longitudinal grooves of the tool holders. For a more detailed illustration, reference is made to copending application, Ser. No. 691,347. Set screws, which are also not shown in detail, allow locking of these tool holders in the dovetailed guides in predetermined positions.

Figure 3:
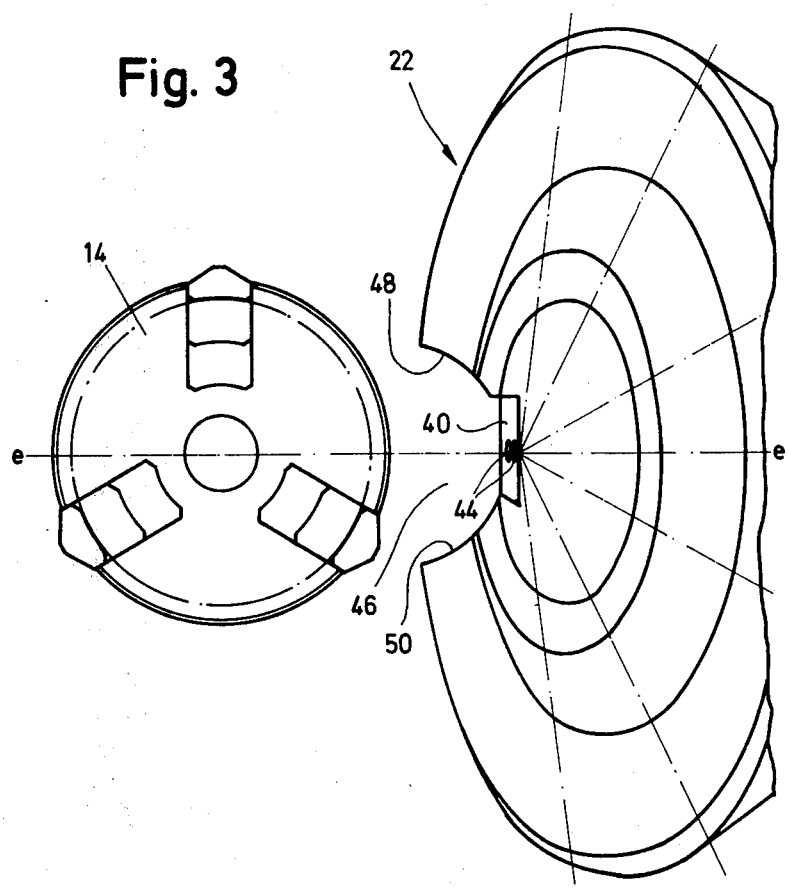
FIG. 3 is a partial view in the direction of arrow A of FIG. 1 on a larger scale.

The plane receiving surfaces 40 for the inside machining tools 42 form the base of groove-like recesses 46, the side walls 48, 50 of which have a concave curvature. The arrangement of these groove-like recesses 46 is made so that when they are in their set working position according to FIG. 3, they can be adjusted by a suitable radial displacement of the turret head coaxially to the live spindle 16 so that rotation-symmetrical parts can suitably enter them in order to allow inside machining operations.

It is claimed:

1. An automatic turret lathe having a live spindle with an axis of rotation, a turret carriage, and an indexing turret head mounted on said turret carriage for indexing movement about an indexing axis and positioned so that its indexing axis is at an acute angle to the live spindle axis, said turret head having a plurality of tool receivers located at angular distances from each other around said indexing axis for supporting alternately outside machining tools and inside machining tools, the tool receivers for said outside machining tools being located at the periphery of said turret head so as to provide a working position in a first plane perpendicular to said live spindle axis, and the tool receivers for said inside machining tools being arranged so as to provide a working position in a second plane parallel to said live spindle axis and perpendicular to the plane defining the working position of tool receivers for the outside machining tools.

2. An automatic turret lathe according to claim 1, wherein said tool receivers are formed each by at least one receiving surface of which those receiving surfaces for said outside machining tools when in working position are in said first plane perpendicular to said live spindle axis and penetrated by the latter, and those receiving surfaces for said inside machining tools when in their working position are in said second plane parallel to said live spindle axis.

3. An automatic turret lathe according to claim 2, wherein said turret head defines a plurality of groove-like recesses for accepting tool holders for said inside and outside machining tools, and said receiving surfaces form respectively the bases of said groove-like recesses.

4. An automatic turret lathe according to claim 3, wherein the walls of said groove-like recesses for accepting the tool holders for the inside machining tools have a concave curvature and can be adjusted coaxially relative to said live spindle when in their working positions.

5. An automatic turret lathe according to claim 3, wherein means are provided so that the tool holders for the outside machining tools can be adjusted and locked on the respective receiving surfaces perpendicular to said live spindle axis, and means are provided so that the tool holders of the inside machining tools can be adjusted and locked on the respective receiving surfaces parallel to said live spindle axis.

6. An automatic turret lathe according to claim 5, wherein at least the tool receiving surfaces for the inside machining tools have at least one mounting point for the corresponding tool holders oriented in the direction of said live spindle axis.

7. An automatic turret lathe according to claim 2, wherein the position of the receiving surfaces in the turret head for said inside machining tools are selected so that the distance of these receiving surfaces from the end of the adjacent receiving surfaces for the outside machining tools oriented toward the front turret head face in the projection of the turret head onto a plane containing the indexing axis and said live spindle axis is greater by a multiple then their distance from the end of the receiving surfaces for the outside machining tools oriented toward the back turret head face.

8. An automatic turret lathe according to claim 7, wherein said acute angle is 60°.

* * * * *